US008294703B2

(12) United States Patent
Kim et al.

(10) Patent No.: US 8,294,703 B2
(45) Date of Patent: Oct. 23, 2012

(54) ORGANIC LIGHT EMITTING DIODE DISPLAY AND METHOD OF DRIVING THE SAME

(75) Inventors: Inhwan Kim, Gyeonggi-do (KR); Juhnsuk Yoo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 463 days.

(21) Appl. No.: 12/622,781

(22) Filed: Nov. 20, 2009

(65) Prior Publication Data

US 2010/0328301 A1 Dec. 30, 2010

(30) Foreign Application Priority Data

Jun. 24, 2009 (KR) ........................ 10-2009-0056598

(51) Int. Cl.
*G06F 3/038* (2006.01)
(52) U.S. Cl. ............... 345/214; 345/76; 345/80; 345/84
(58) Field of Classification Search ........................ None
See application file for complete search history.

(56) References Cited

U.S. PATENT DOCUMENTS 6,111,559 A * 8/2000 Motomura et al. ........... 345/102
6,177,914 B1 * 1/2001 Iwama et al. ................... 345/60
7,170,477 B2 * 1/2007 Okamoto et al. ............... 345/77
7,355,574 B1 * 4/2008 Leon et al. ....................... 345/82
7,414,622 B2 * 8/2008 Abe et al. ....................... 345/204
7,551,164 B2 * 6/2009 Deane ........................... 345/204
7,574,068 B2 * 8/2009 Hung ............................ 382/274
7,609,239 B2 * 10/2009 Chang ............................. 345/82
8,149,195 B2 * 4/2012 Oh et al. .......................... 345/87
2007/0290957 A1 * 12/2007 Cok ................................ 345/77
2008/0055289 A1 * 3/2008 Kim et al. ..................... 345/204
2008/0252568 A1 * 10/2008 Kwon ............................. 345/76
2009/0244044 A1 * 10/2009 Furuichi ....................... 345/211
2010/0020051 A1 * 1/2010 Kim et al. ..................... 345/207

* cited by examiner

*Primary Examiner* — Dismery Mercedes
(74) *Attorney, Agent, or Firm* — Morgan Lewis & Bockius LLP

(57) ABSTRACT

An organic light emitting diode display includes: a display module including a data driver for supplying data signals to a panel, a scan driver for supplying scan signals to the panel, and a timing driver for controlling the data driver and the scan driver; and a compensation driver for, upon receipt of a termination signal for terminating the display module, during a termination period in which the display module is terminated, setting a compensation period with reference to the driving time of the display module, and supplying a compensation signal to the panel.

10 Claims, 3 Drawing Sheets

ORGANIC LIGHT EMITTING DIODE DISPLAY AND METHOD OF DRIVING THE SAME

This application claims the benefit of Korean Patent Application NO. 10-2009-0056598 filed on Jun. 24, 2009, which is hereby incorporated by reference.

BACKGROUND

1. Field

This document relates to an organic light emitting diode display and a method of driving the same.

2. Related Art

An organic light emitting device used for an organic light emitting diode display is a self-light emitting device which has a light emitting layer formed between two electrodes positioned on a substrate. Organic light emitting diode displays are classified into a top-emission type, a bottom-emission type, and a dual-emission type according to a direction of emitting light. The organic light emitting displays are also classified into a passive matrix type and an active matrix type according to the driving method thereof.

In the organic light emitting diode display, when a scan signal, a data signal, and power are supplied to a plurality of sub-pixels disposed in matrix form, selected sub-pixels emit light to display an image. An organic light emitting device used for an organic light emitting diode display deteriorates over time due to the characteristics of the device and this leads to a problem that the driving characteristics thereof are changed.

Conventionally, to overcome this problem, a compensation circuit has been implemented in the sub-pixels. However, an organic light emitting diode display employing the sub-pixels having the compensation circuit implemented therein requires preparation time and compensation time for storing a threshold voltage Vth of a driving transistor within the driving time of one frame (60 Hz), thereby shortening actual driving time.

SUMMARY

An exemplary embodiment of the present invention provides an organic light emitting diode display, including: a display module including a data driver for supplying a data signal to a panel, a scan driver for supplying a scan signal to the panel, and a timing driver for controlling the data driver and the scan driver; and a compensation driver for, response to a termination signal for terminating the display module, during a termination period in which the display module is terminated, setting a compensation period with based on the driving time of the display module, and supplying a compensation signal to the panel.

In another aspect, the present invention provides an organic light emitting diode display, including: a display module including a data driver for supplying data signals to a panel, a scan driver for supplying scan signals to the panel, and a timing driver for controlling the data driver and the scan driver; and a compensation driver for, response to a termination signal for terminating the display module, during a termination period in which the display module is terminated, setting a compensation period with based on a driving time of the display module, setting an algorithm of a compensation signal, and supplying the compensation signal to the panel.

In another aspect, the present invention provides a method of driving an organic light emitting diode display, including: response to a termination signal for terminating the display module, during a termination period in which the display module is terminated, calculating a driving time of a display module and an average value of data signals supplied to the display module; determining a level of a compensation signal to be supplied to the panel with based on the driving time of the display module and the average value of the data signals supplied to the panel; and setting a compensation period in which the compensation signal is supplied to the panel with based on the driving time of the display module.

In another aspect, the present invention provides a method of driving an organic light emitting diode display, including: response to a termination signal for terminating the display module, during a termination period in which the display module is terminated, calculating a driving time of a display module and an average value of data signals supplied to the display module; determining a level of a compensation signal to be supplied to the panel with based on the driving time of the display module and the average value of the data signals supplied to the panel; and setting a compensation period in which the compensation signal is supplied to the panel with based on the driving time of the display module, setting an algorithm of the compensation signal, and supplying the compensation signal to the panel.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

DETAILED DESCRIPTION

Reference will now be made in detail to embodiments of the invention, examples of which are illustrated in the accompanying drawings.

Hereinafter, a concrete example according to an exemplary embodiment of the present invention will be described with reference to the accompanying drawings

First Exemplary Embodiment

Figure 1:
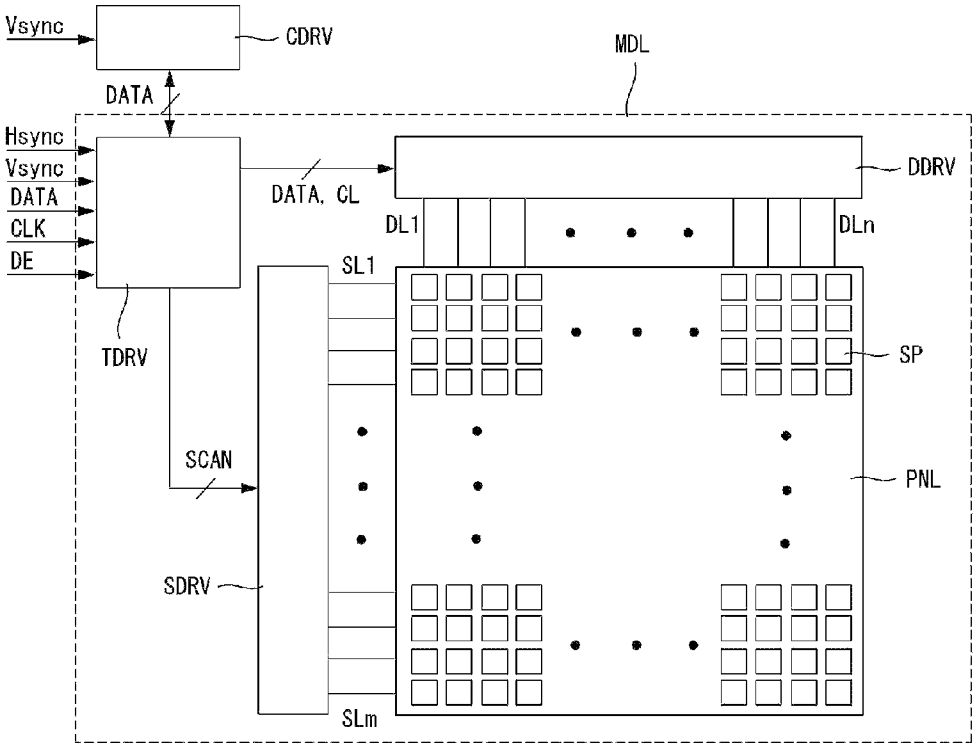
FIG. 1 is a schematic block diagram of an organic light emitting diode display according to a first exemplary embodiment of the present invention.
Figure 2:
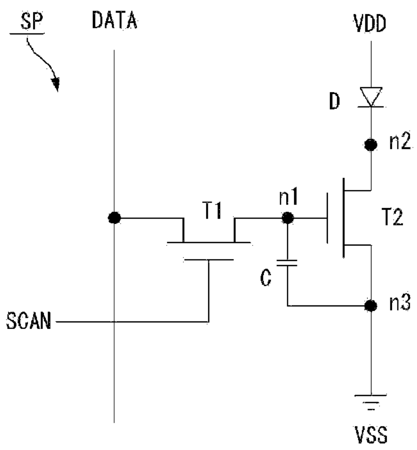
FIG. 2 is a circuit configuration diagram of a sub-pixel having a 2T1C structure.
Figure 3:
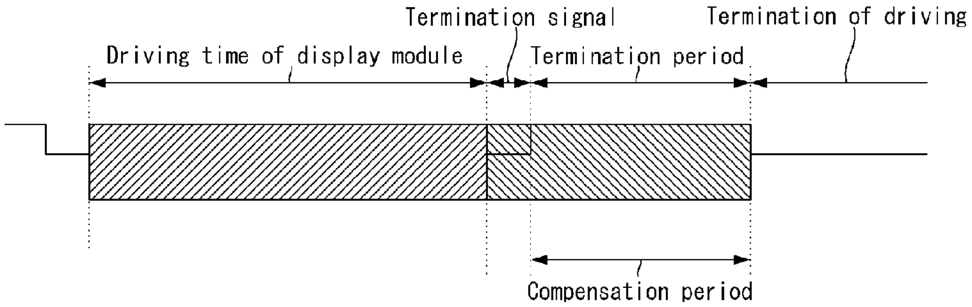
FIG. 3 is a waveform diagram for explaining a method for setting a compensation period of a compensation driver.
Figure 4:
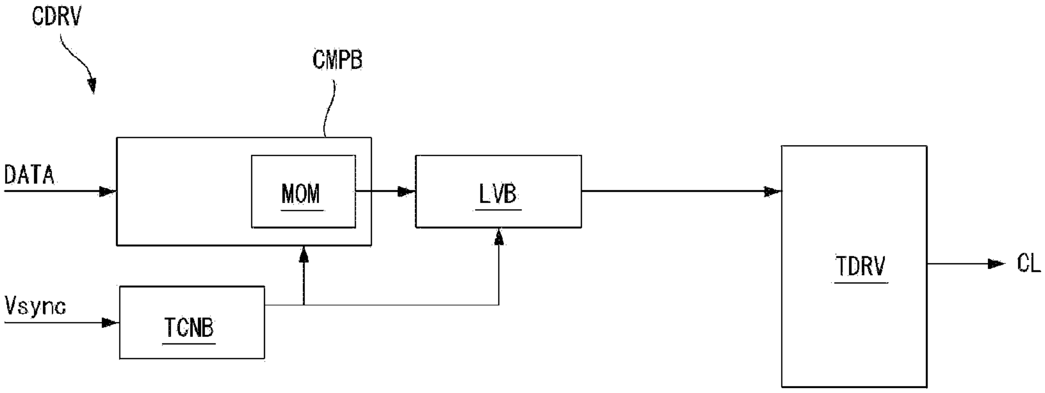
FIG. 4 is a schematic block diagram of the compensation driver according to the first exemplary embodiment.

Referring to FIGS. 1 to 3, an organic light emitting diode display according to a first exemplary embodiment of the present invention includes a panel PNL, a display module MDL including a data driver DDRV, a scan driver SDRV, and a timing driver TDRV, and a compensation driver CDRV.

The panel PNL includes sub-pixels SP disposed in matrix form. The data driver DDRV supplies data signals through data lines DL1 . . . DLn connected to the sub-pixels SP. The scan driver SDRV supplies scan signals through scan lines SL1 . . . SLm connected to the sub-pixels SP. The timing driver TDRV controls the data driver DDRV and the scan driver SDRV.

The sub-pixels SP may be formed in a typical 2T(transistor)1C(capacitor) structure. As shown in FIG. 2, a sub-pixel SP having the 2T1C structure includes a switching transistor T1, a driving transistor T2, a capacitor C, and an organic light emitting diode D.

In the switching transistor T1, a gate is connected to the scan line SL1, a first electrode is connected to the data line DL1, and a second electrode is connected to the first node n1. In the driving transistor T2, a gate is connected to the first node n1, a first electrode is connected to the second node n2, and a second electrode is connected to a third node n3 connected to a low potential power supply line VSS. One end of the capacitor C is connected to the first node n1, and the other end thereof is connected to the third node n3. An anode of the organic light emitting diode D is connected to a high potential power supply line VDD, and a cathode thereof is connected to the second node n2.

Although the above description has been made with respect to an example in which the transistors T1 and T2 included in the sub-pixel are configured in an N-type, the exemplary embodiment of the present invention is not limited thereto. Also, a high-potential power supplied through the high-potential power supply line VDD may be higher than a low-potential power supplied through the low-potential power supply line VDD, and a level of the power supplied through the high-potential power supply line VDD and the low-potential power supply line VSS can be switched according to a driving method.

The above sub-pixel having the 2T1C structure operates as follows. When a scan signal is supplied through the scan line SL1, the switching transistor T1 is turned on. When a data signal supplied through the data line DL1 is supplied to the first node n1 via the turned-on switching transistor T1, the data signal is stored as a data voltage in the capacitor C. When the scan signal is interrupted and the switching transistor T1 is turned off, the driving transistor T2 is driven corresponding to the data voltage stored in the capacitor C. When a high-potential power supplied through the high-potential power supply line VDD flows through the low-potential power voltage line VSS, the organic light emitting diode D emits light. However, this is in accordance with the structure of a sub-pixel shown in FIG. 2 and an example of the driving method, but the exemplary embodiment of the present invention is not limited thereto and a sub-pixel can be formed in any of 3T1C, 4T1C, and 4T2C structures in which a compensation circuit is incorporated.

Upon receipt of a termination signal for terminating the display module MDL, during a termination period in which the display module MDL is terminated, the compensation driver CDRV sets a compensation period with reference to the driving time of the display module MDL and supplies a compensation signal CL to the panel PNL.

As shown in FIG. 3, in the exemplary embodiment, after a power signal for firstly driving the display module MDL is input, a termination period for supplying the compensation signal CL to the panel PNL is provided before the power of the display module MDL is switched off depending on the driving time for which the display module MDL is driven and a termination signal to be input later. The termination period and the compensation period may be set identically or differently. However, the compensation period may be set depending on the driving time of the display module MDL. In FIG. 3, "termination of driving" represents a period in which the power of the display module MDL is actually switched off after the compensation signal CL is supplied to the panel PNL during the compensation period. If the structure of a sub-pixel is as shown in FIG. 2, the compensation signal CL is supplied to the gate and source Vgs of the driving transistor T2.

The compensation driver CDRV is largely comprised of a part for calculating a driving time of the display module MDL, for example, a time calculation part, and a part for determining a level of a compensation signal CL supplied to the panel PNL with reference to an average value of data signals supplied to the display module MDL and setting a compensation period with reference to the driving time of the display module MDL, for example, a data compensation part. The compensation driver CDRV may be positioned separately from the display module MDL or included in the timing driver TDRV. If the compensation driver CDRV is positioned separately from the display module MDL, a compensation signal CL generated from the compensation driver CDRV may be supplied to the panel PNL in cooperation with the scan driver SDRV and the data driver DDRV. Alternatively, if the compensation driver CDRV is included in the timing driver TDRV, a compensation signal CL generated from the compensation driver CDRV may be supplied to the panel PNL under control of the timing driver TDRV.

The timing driver TDRV may receive a horizontal synchronization signal Hsync, a vertical synchronization signal Vsync, an image data signal DATA, a data enable signal DE, a clock signal CLK, etc. from the outside, and controls the scan driver SDRV and the data driver DDRV by use of these signals.

The scan driver SDRV may receive a scan control signal GDC from the timing driver TDRV and generate a scan signal with reference the scan control signal GDC. To this end, the scan driver SDRV may include a shift register for receiving a scan control signal GDC, a level shifter for adjusting a level of the signal transmitted from the shift register, and an output buffer for outputting the signal transmitted from the level shifter, but the present invention is not limited thereto.

The data driver DDRV may receive an image data signal DATA, a data control signal DDC, and a compensation signal CL from the timing driver TDRV and generate a data signal DATA and a compensation signal CL with reference to the data control signal DDC. To this end, the data driver DDRV may include a shift register for receiving a data control signal DDC, a latch for storing one or more of an image data signal DATA and a compensation signal CL with reference to the signal transmitted from the shift register, and an output buffer for outputting one or more of the image data signal DATA and the compensation signal CL transmitted from the latch, but the present invention is not limited thereto.

Hereinafter, the compensation driver CDRV will be described in more detail.

Referring to FIGS. 1 to 4, the compensation driver CDRV includes a counter TCNB for calculating a driving time of the display module, an average value calculator CMPB for calculating and storing an average value of data signals supplied to the display module MDL during the driving time, and a level selector LVB for determining a level of a compensation signal CL to be supplied to the panel PNL with reference to the calculated driving time and the average value of the data signals.

The counter TCNB counts the cycle of a vertical synchronization signal Vsync supplied to the display module MDL in order to calculate the driving time of the display module MDL. To this end, the counter TCNB receives a vertical synchronization signal Vsync from the outside or the timing controller TDRV.

The average value calculator CMPB includes a memory MOM in order to calculate the average value of the data signals supplied to the display module MDL and store it. The average value calculator CMPB may calculate the average value of all the data signals supplied to all sub-pixels SP as one value or may divide it by at least one frame. However, the average value calculator CMPB may employ the method of dividing all data signals for each gray level and calculating an average value of any one or more of a data signal corresponding to the highest gray level, a data signal corresponding to the intermediate gray level, and a data signal corresponding to the lowest gray level among the signals divided for each gray level.

The level selector LVB selects a level of a compensation signal CL to be supplied to the panel PNL with reference to the driving time calculated in the counter TCNB and the average value of the data signals calculated in the average value calculator CMPB. The level of the compensation signal CL may differ depending on the driving time and the average value of the data signals, and the compensation signal CL may have a level lower than those of the data signals, for example, a level of "0V" or a negative voltage less than "0V". At this time, the level may be adjusted by a pulse width modulation or a pulse amplitude modulation, but the present invention is not limited thereto.

Hereinafter, a driving method according to an algorithm for supplying a compensation signal CL of negative data form to the sub-pixels SP will be described by way of example of the exemplary embodiment.

Referring to FIGS. 1 to 3, in the driving method according to the first exemplary embodiment of the present invention, when a termination signal for terminating the display module MDL is input, a driving time of the display module MDL and an average value of data signals supplied to the display module MDL are calculated during a termination period in which the display module MDL is terminated. Also, a level of a compensation signal CL to be supplied to the panel PNL is determined with reference to the driving time of the display module MDL and the average value of the data signals supplied to the display module MDL. Then, a compensation period in which the compensation signal CL is supplied to the panel PNL is set with reference to the driving time of the display module MDL. As explained above, the driving time may be calculated by counting the cycle of a vertical synchronization signal Vsync supplied to the display module MDL.

Figure 5:
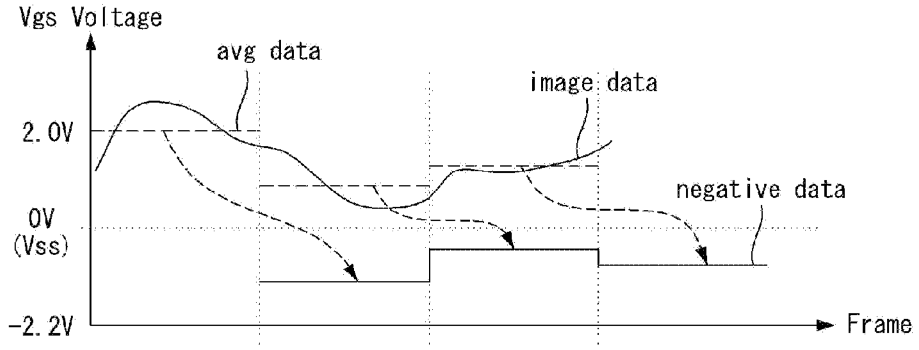
FIG. 5 is a waveform diagram for explaining an algorithm for supplying negative data to a sub-pixel.
Figure 6:
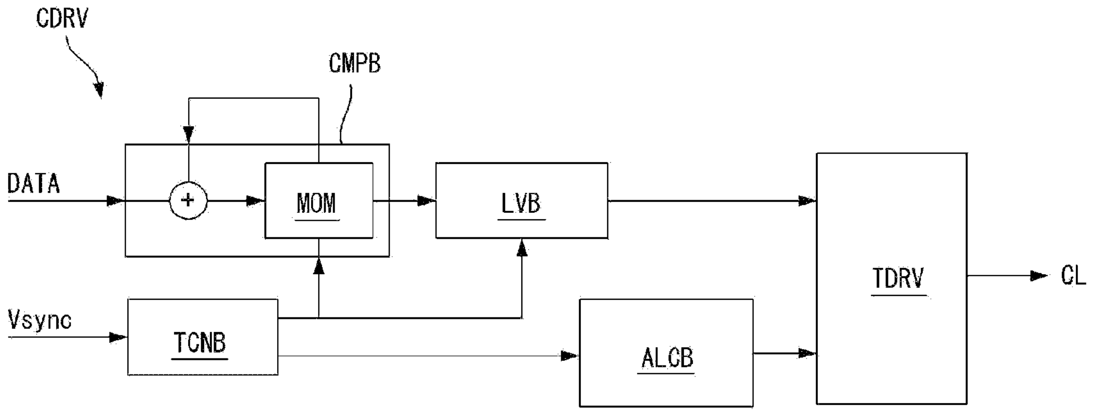
FIG. 6 is a schematic block diagram of a compensation driver according to a second exemplary embodiment.

FIG. 5 is an example of the exemplary embodiment, which shows that the average value of all data signals (image data) supplied to the sub-pixels SP included in the panel PNL is divided into three segments by frames. A compensation signal (negative data) supplied into the three segments has a level lower than those of all the data signals (image data) and the level of the compensation signal (negative data) differs by segments. That is, the level of the compensation signal (negative data) may be determined as corresponding negative data depending on the level of the calculated average value (avg data). If the compensation signal (negative data) is supplied for several seconds by the same method as in the exemplary embodiment, luminance reduction caused by a shift of the threshold voltage Vth of the driving transistors included in the sub-pixels SP decreases and hence a long life span of the device can be anticipated.

Second Exemplary Embodiment

As shown in FIG. 1, an organic light emitting diode display according to a second exemplary embodiment of the present invention includes a panel PNL, a display module MDL including a data driver DDRV, a scan driver SDRV, and a timing driver TDRV, and a compensation driver CDRV.

The panel PNL, the data driver DDRV, the scan driver SDRV, and the timing driver TDRV are identical to those described in the first exemplary embodiment, thus description thereof will be omitted to avoid repetition of the description.

As shown in FIGS. 1 and 3, upon receipt of a termination signal for terminating the display module MDL, during a termination period in which the display module MDL is terminated, the compensation driver CDRV sets a compensation period with reference to the driving time of the display module MDL and supplies a compensation signal CL to the panel PNL. As shown in FIG. 3, in the exemplary embodiment, after a power signal for firstly driving the display module MDL is input, a termination period for supplying the compensation signal CL to the panel PNL is provided before the power of the display module MDL is switched off depending on the driving time for which the display module MDL is driven and a termination signal to be input later. The termination period and the compensation period may be set identically or differently. However, the compensation period may be set depending on the driving time of the display module MDL. In FIG. 3, "termination of driving" represents a period in which the power of the display module MDL is actually switched off after the compensation signal CL is supplied to the panel PNL during the compensation period. If the structure of a sub-pixel is as shown in FIG. 2, the compensation signal CL is supplied to the gate and source Vgs of the driving transistor T2.

The compensation driver CDRV is largely comprised of a part for calculating a driving time of the display module MDL, for example, a time calculation part, and a part for determining a level of a compensation signal CL supplied to the panel PNL with reference to an average value of data signals supplied to the display module MDL and setting a compensation period with reference to the driving time of the display module MDL, for example, a data compensation part. The compensation driver CDRV may be positioned separately from the display module MDL or included in the timing driver TDRV. If the compensation driver CDRV is positioned separately from the display module MDL, a compensation signal CL generated from the compensation driver CDRV may be supplied to the panel PNL in cooperation with the scan driver SDRV and the data driver DDRV. Alternatively, if the compensation driver CDRV is included in the timing driver TDRV, a compensation signal CL generated from the compensation driver CDRV may be supplied to the panel PNL under control of the timing driver TDRV.

Hereinafter, the compensation driver CDRV will be described in more detail.

Referring to FIGS. 1 to 6, the compensation driver CDRV includes a counter TCNB for calculating a driving time of the display module, an average value calculator CMPB for calculating and storing an average value of data signals supplied to the display module MDL during the driving time, a level selector LVB for determining a level of a compensation signal CL to be supplied to the panel PNL with reference to the calculated driving time and the average value of the data signals, and an algorithm controller ALCB for setting an algorithm of the compensation signal CL with reference to the driving time.

The counter TCNB counts the cycle of a vertical synchronization signal Vsync supplied to the display module MDL in order to calculate the driving time of the display module MDL. To this end, the counter TCNB receives a vertical synchronization signal Vsync from the outside or the timing controller TDRV.

The average value calculator CMPB includes a memory MOM in order to calculate the average value of the data signals supplied to the display module MDL and store it. The average value calculator CMPB may calculate the average value of all the data signals supplied to all sub-pixels SP as one value or may divide it by at least one frame. However, the average value calculator CMPB may employ the method of dividing all data signals for each gray level and calculating an average value of any one or more of a data signal corresponding to the highest gray level, a data signal corresponding to the intermediate gray level, and a data signal corresponding to the lowest gray level among the signals divided for each gray level.

The level selector LVB selects a level of a compensation signal CL to be supplied to the panel PNL with reference to the driving time calculated in the counter TCNB and the average value of the data signals calculated in the average value calculator CMPB. The level of the compensation signal CL may differ depending on the driving time and the average value of the data signals, and the compensation signal CL may have a level lower than those of the data signals, for example, a level of “0V” or a negative voltage less than “0V”. At this time, the level may be adjusted by a pulse width modulation or a pulse amplitude modulation, but the present invention is not limited thereto.

The algorithm controller ALCB sets one or more of the algorithm of the compensation signal CL and a compensation period with reference to the driving time calculated in the counter TCNB. The algorithm controller ALCB can set a compensation algorithm depending on the structure of the sub-pixels SP and generate a control signal so that the timing driver TDRV may control the scan driver SDRV and the data driver DDRV based on the set compensation algorithm. The compensation algorithm may be any conventionally well-known algorithm. Here, examples of the compensation algorithm may include an algorithm for supplying a compensation signal CL equivalent to “0V” or a negative voltage less than “0V” to improve the life span of the driving transistors included in the sub-pixels and an algorithm for supplying a compensation signal CL for controlling a gamma voltage in positive or negative form, but the present invention is not limited thereto. However, the compensation algorithm may be selected depending on the structure of the sub-pixels SP. Further, the algorithm controller ALCB can generate a control signal so that the timing driver TDrV may set a compensation period depending on the structure of the sub-pixels SP on the basis of a selected algorithm. That is, the algorithm controller ALCB determines which algorithm is to be selected and how long the compensation period is to be set depending on the structure of the sub-pixels SP.

Referring again to FIGS. 1 to 3, in the driving method according to the second exemplary embodiment of the present invention, when a termination signal for terminating the display module MDL is input, a driving time of the display module MDL and an average value of data signals supplied to the display module MDL are calculated during a termination period in which the display module MDL is terminated. Also, a level of a compensation signal CL to be supplied to the panel PNL is determined with reference to the driving time of the display module MDL and the average value of the data signals supplied to the display module MDL. Then, a compensation period in which the compensation signal CL is supplied to the panel PNL is set with reference to the driving time of the display module MDL. As explained above, the driving time may be calculated by counting the cycle of a vertical synchronization signal Vsync supplied to the display module MDL.

In the exemplary embodiment, too, if the compensation signal (negative data) is supplied for several seconds during the termination period by the same method as in FIG. 5*i*, luminance reduction caused by a shift of the threshold voltage Vth of the driving transistors included in the sub-pixels SP decreases and hence a long life span of the device can be anticipated.

As seen from above, the present invention provides an organic light emitting diode display and a method of driving the same which can anticipate a long life span of the panel and improve display quality by supplying a compensation signal during a predetermined period before the driving of the display module is terminated. Also, the present invention can implement a compensation signal in various algorithms depending on the structure of the sub-pixels.

What is claimed is:

1. An organic light emitting diode display, comprising:

a display module including a data driver for supplying data signals to a panel, a scan driver for supplying scan signals to the panel, and a timing driver for controlling the data driver and the scan driver; and a compensation driver for, response to a termination signal for terminating the display module, during a termination period in which the display module is terminated, setting a compensation period with based on a driving time of the display module, and supplying a compensation signal to the panel, wherein the compensation driver comprises:

a counter for calculating a driving time of the display module;

an average value calculator for calculating and storing an average value of data signals supplied to the display module during the driving time; and a level selector for determining a level of a compensation signal to be supplied to the panel with reference to the calculated driving time and the average value of the data signals.

2. The organic light emitting diode display of claim 1, wherein a level of the compensation signal supplied to the panel is determined with reference to the driving time of the display module and an average value of the data signals supplied to the display module.

3. The organic light emitting diode display of claim 1, wherein the counter counts the cycle of a vertical synchronization signal supplied to the display module in order to calculate the driving time of the display module.

4. The organic light emitting diode display of claim 1, wherein the compensation signal is supplied to the gate and source/drain of the driving transistors of sub-pixels disposed on the panel.

5. The organic light emitting diode display of claim 1, wherein the compensation signal has a level lower than those of the data signals.

6. An organic light emitting diode display, comprising:

a display module including a data driver for supplying data signals to a panel, a scan driver for supplying scan signals to the panel, and a timing driver for controlling the data driver and the scan driver; and a compensation driver for, response to a termination signal for terminating the display module, during a termination period in which the display module is terminated, setting a compensation period with based on a driving time of the display module, setting an algorithm of a compensation signal, and supplying the compensation signal to the panel, wherein the compensation driver comprises:

a counter for calculating a driving time of the display module;

an average value calculator for calculating and storing an average value of data signals supplied to the display module during the driving time;

a level selector for determining a level of a compensation signal to be supplied to the panel with reference to the calculated driving time and the average value of the data signals; and an algorithm controller for setting an algorithm of the compensation signal with reference to the driving time.

7. The organic light emitting diode display of claim 6, wherein a level of the compensation signal supplied to the panel is determined with reference to the driving time of the display module and an average value of the data signals supplied to the display module.

8. The organic light emitting diode display of claim 6, wherein the counter counts the cycle of a vertical synchronization signal supplied to the display module in order to calculate the driving time of the display module.

9. The organic light emitting diode display of claim 6, wherein the compensation signal is supplied to the gate and source/drain of the driving transistors of sub-pixels disposed on the panel.

10. The organic light emitting diode display of claim 6, wherein the compensation signal has a level lower than those of the data signals.

* * * * *